United States Patent
Peng

(10) Patent No.: US 9,307,162 B2
(45) Date of Patent: Apr. 5, 2016

(54) LOCAL ENHANCEMENT APPARATUS AND METHOD TO GENERATE HIGH DYNAMIC RANGE IMAGES BY BLENDING BRIGHTNESS-PRESERVED AND BRIGHTNESS-ADJUSTED BLOCKS

(71) Applicant: Himax Imaging Limited, Tainan (TW)

(72) Inventor: Yuan-Chih Peng, Tainan (TW)

(73) Assignee: HIMAX IMAGING LIMITED, Tainan (TW)

(*) Notice: Subject to any disclaimer, the term of this patent is extended or adjusted under 35 U.S.C. 154(b) by 93 days.

(21) Appl. No.: 14/284,215

(22) Filed: May 21, 2014

(65) Prior Publication Data

US 2015/0341537 A1 Nov. 26, 2015

(51) Int. Cl.
| | |
|---|---|
| H04N 5/235 | (2006.01) |
| H04N 5/355 | (2011.01) |
| H04N 5/353 | (2011.01) |
| G06K 9/46 | (2006.01) |

(52) U.S. Cl.
CPC ............... *H04N 5/2355* (2013.01); *G06K 9/46* (2013.01); *G06K 9/4642* (2013.01); *H04N 5/235* (2013.01); *H04N 5/2351* (2013.01); *H04N 5/353* (2013.01); *H04N 5/35536* (2013.01)

(58) Field of Classification Search
None
See application file for complete search history.

(56) References Cited

U.S. PATENT DOCUMENTS

| | | | | |
|---|---|---|---|---|
| 5,963,665 | A * | 10/1999 | Kim | G06T 5/40 348/254 |
| 7,609,320 | B2 * | 10/2009 | Okamura | H04N 5/2355 348/221.1 |
| 2004/0207734 | A1 * | 10/2004 | Horiuchi | H04N 1/4074 348/229.1 |
| 2004/0218830 | A1 * | 11/2004 | Kang | G06T 5/50 382/274 |
| 2008/0253758 | A1 * | 10/2008 | Yap | G03B 7/08 396/234 |
| 2009/0295941 | A1 * | 12/2009 | Nakajima | G06T 5/009 348/229.1 |
| 2010/0157078 | A1 * | 6/2010 | Atanassov | G06T 5/007 348/222.1 |
| 2011/0096988 | A1 * | 4/2011 | Suen | G06T 5/007 382/168 |
| 2014/0152686 | A1 * | 6/2014 | Narasimha | G09G 5/377 345/589 |
| 2014/0184894 | A1 * | 7/2014 | Motta | H04N 5/2353 348/362 |
| 2015/0244916 | A1 * | 8/2015 | Kang | H04N 5/2353 348/222.1 |

* cited by examiner

*Primary Examiner* — Shahbaz Nazrul
(74) *Attorney, Agent, or Firm* — McClure, Qualey & Rodack, LLP

(57) ABSTRACT

An embodiment of a local enhancement apparatus is provided, in which a block divider divides an image into a plurality of blocks, and a first enhancement unit performs a brightness-preserved enhancement on each block of the plurality of blocks to generate a brightness-preserved block. A second enhancement unit performs a brightness-adjusted enhancement on the each block to generate a brightness-adjusted block. A scene dynamic range estimator generates a dynamic range of the image according to characteristics of the image. A blender blends the brightness-preserved blocks and the brightness-adjusted blocks to generate an enhanced image based on the dynamic range.

19 Claims, 5 Drawing Sheets

LOCAL ENHANCEMENT APPARATUS AND METHOD TO GENERATE HIGH DYNAMIC RANGE IMAGES BY BLENDING BRIGHTNESS-PRESERVED AND BRIGHTNESS-ADJUSTED BLOCKS

BACKGROUND OF THE INVENTION

1. Field of the Invention

The present invention relates to image processing technology, and in particular relates to a method and an apparatus for enhancing image.

2. Description of the Related Art

In digital photography, many approaches have been developed to construct high dynamic range images. One of these approaches is to combine multiple exposures of the same scene to retain detail in light and dark areas.

Various image enhancement approaches are used to improve image quality. Take contrast enhancement as an example, which is a procedure used to improve contrast in images. Compared with global contrast enhancement, local contrast enhancement can bring out more detail in an image. For local contrast enhancement, an image is first divided into several blocks, and then a procedure called histogram equalization is performed to each of the blocks so that the pixel values of pixels in a block are transformed based on a contrast enhancement function of the block.

Histogram equalization processing of the local contrast enhancement may change the brightness of each block. For example, if a block contains more dark pixels, the brightness of the block may increase after the histogram equalization processing. On the other hand, if a block contains more light pixels, the brightness of the block may decrease after the histogram equalization processing. In a scene that its dynamic range is close to the dynamic range an image sensor can reproduce, however, the local contrast enhancement by local histogram equalization may reduce the global contrast due to the block-wise brightness adjustment. That is, if a block contains more dark pixels, the brightness of the block may increase to reveal more details after the histogram equalization processing, but the increased brightness of an original darker block would decrease the global contrast.

BRIEF SUMMARY OF THE INVENTION

An embodiment of a local enhancement apparatus is provided, in which a block divider divides an image into a plurality of blocks, and a first enhancement unit performs a brightness-preserved enhancement on each block of the plurality of blocks to generate a brightness-preserved block. A second enhancement unit performs a brightness-adjusted enhancement on the each block to generate a brightness-adjusted block. A scene dynamic range estimator generates a dynamic range of the image according to characteristics of the image. A blender blends the brightness-preserved blocks and the brightness-adjusted blocks to generate an enhanced image based on the dynamic range.

An embodiment of a multi-exposure imaging system is provided, in which a long exposure image sensor captures a long exposure image based on a long exposure from a scene, and a short exposure image sensor captures a short exposure image based on a short exposure from the scene. An exposure ratio calculator obtains an exposure ratio of the long exposure to the short exposure. A local enhancement apparatus divides a composite image into a plurality of blocks, performs a brightness-preserved enhancement and a brightness-adjusted enhancement on each block of the plurality of blocks to generate a brightness-preserved block and a brightness-adjusted block, and blends the brightness-preserved blocks and the brightness-adjusted blocks to generate an enhanced image based on the exposure ratio.

An embodiment of a local enhancement method is provided, in which a long exposure image and a short exposure image are captured based on a long exposure and a short exposure respectively from a same scene. The long exposure image and the short exposure image are combined to obtain a composite image. A dynamic range is generated based on an exposure ratio of the long exposure to the short exposure. A brightness-adjusted contrast enhancement is performed on the composite image to generate a first contrast enhanced image. A brightness-preserved contrast enhancement is performed on the composite image to generate a second contrast enhanced image. The first contrast enhanced image and the second contrast enhanced image are blended based on the dynamic range.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides a contrast enhancement module to adjust the contrast of images in a multiple exposure image system, in order to make the images adaptable to an image displayer and human eyes. The contrast enhancement module will be described below in accordance with FIGS. 1 and 2.

In order to avoid the local histogram equalization reducing the global contrast, the embodiments of the present invention provides a local contrast enhancement apparatus to adaptively adjust the brightness of each block according to the characteristics of the image. For example, in a scene that its dynamic range is far below a maximum dynamic range (i.e., the dynamic range an image sensor can reproduce), contrast enhancement by local histogram equalization may reduce the global contrast due to the block-wise brightness adjustment; while in another scene that its dynamic range is close to the maximum dynamic range (i.e., the dynamic range an image sensor can reproduce), the local histogram equalization that adjust the brightness of each block may bring out more details of the image. Therefore, in a scene that its dynamic range is below the dynamic range an image sensor can reproduce, a brightness-preserved contrast enhancement is preferred, while in another scene that its dynamic range is close to the dynamic range an image sensor can reproduce, the original contrast enhancement that adjusts brightness of each block is preferred.

Figure 1:
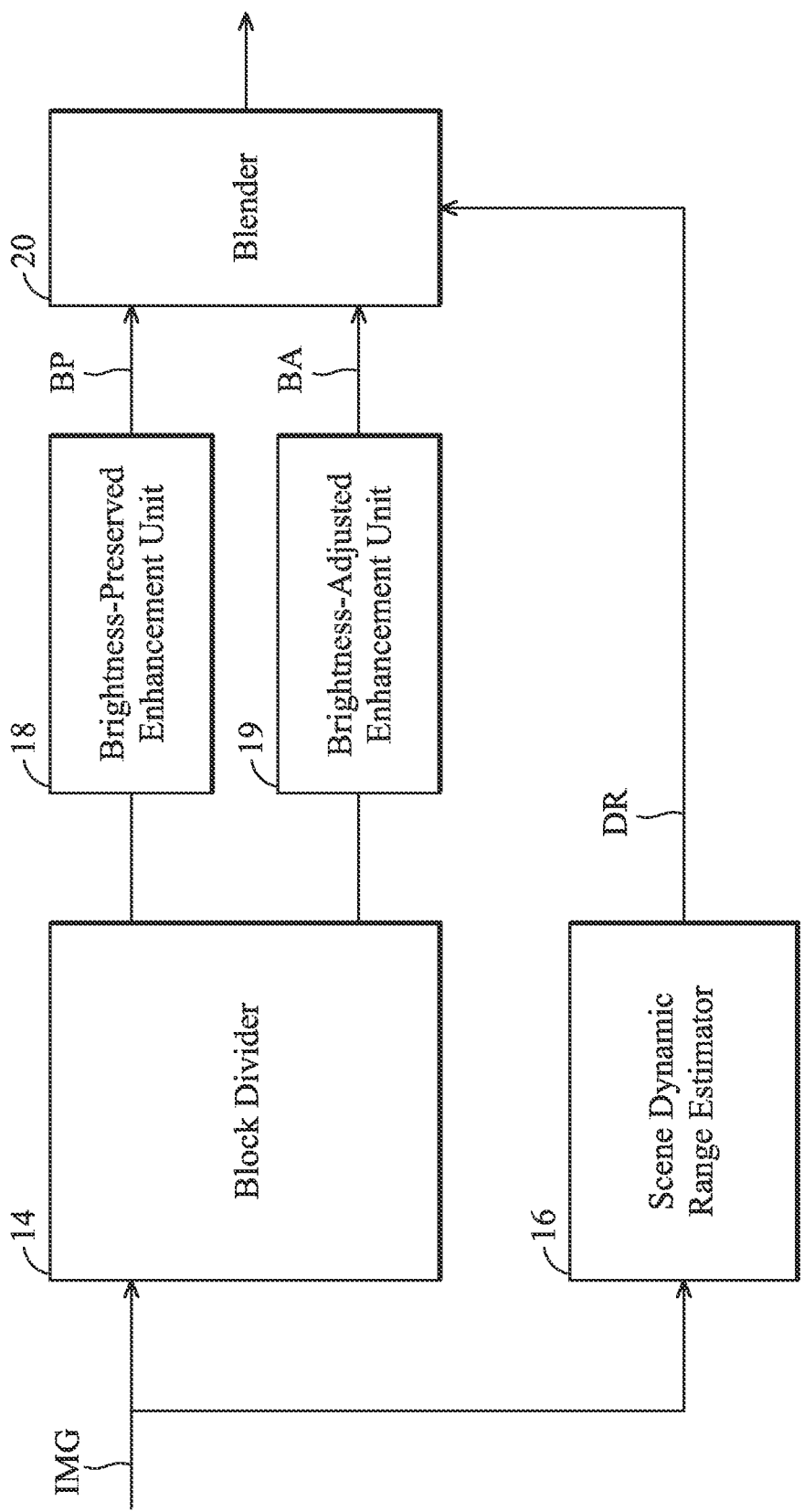
FIG. 1 shows a block diagram of a local enhancement apparatus of an embodiment of the invention.

FIG. 1 shows a block diagram of a local enhancement apparatus of an embodiment of the invention. The local enhancement apparatus receives an image IMG. The image IMG is divided into a plurality of blocks by block divider 14. Each block is processed by brightness-preserved enhancement unit 18 and brightness-adjusted enhancement unit 19. The brightness-preserved enhancement unit 18 performs histogram equalization and preserves the brightness of the block to output a brightness-preserved block BP. The brightness-adjusted enhancement unit 19 performs histogram equalization, adjusts the brightness of the block to reveal more details, and outputs a brightness-adjusted block BA. The scene dynamic range estimator 16 generates the dynamic range DR of the image IMG based on the characteristic of the image IMG. The blender 20 blends the brightness-adjusted block BA and the brightness-preserved block BP to generate an enhanced image based on the dynamic range DR. In a scene that its dynamic range is far below the maximum dynamic range (i.e., the dynamic range an image sensor can reproduce), a brightness-preserved contrast enhancement is preferred by the blender 20, while in another scene that its dynamic range is close to the dynamic range an image sensor can reproduce, the original contrast enhancement that adjusts brightness of each block is preferred by the blender 20. In one example, the blender 20 may use a weighting based on the dynamic range DR to blend the brightness-preserved block BP and the brightness-adjusted block BA.

Figure 2:
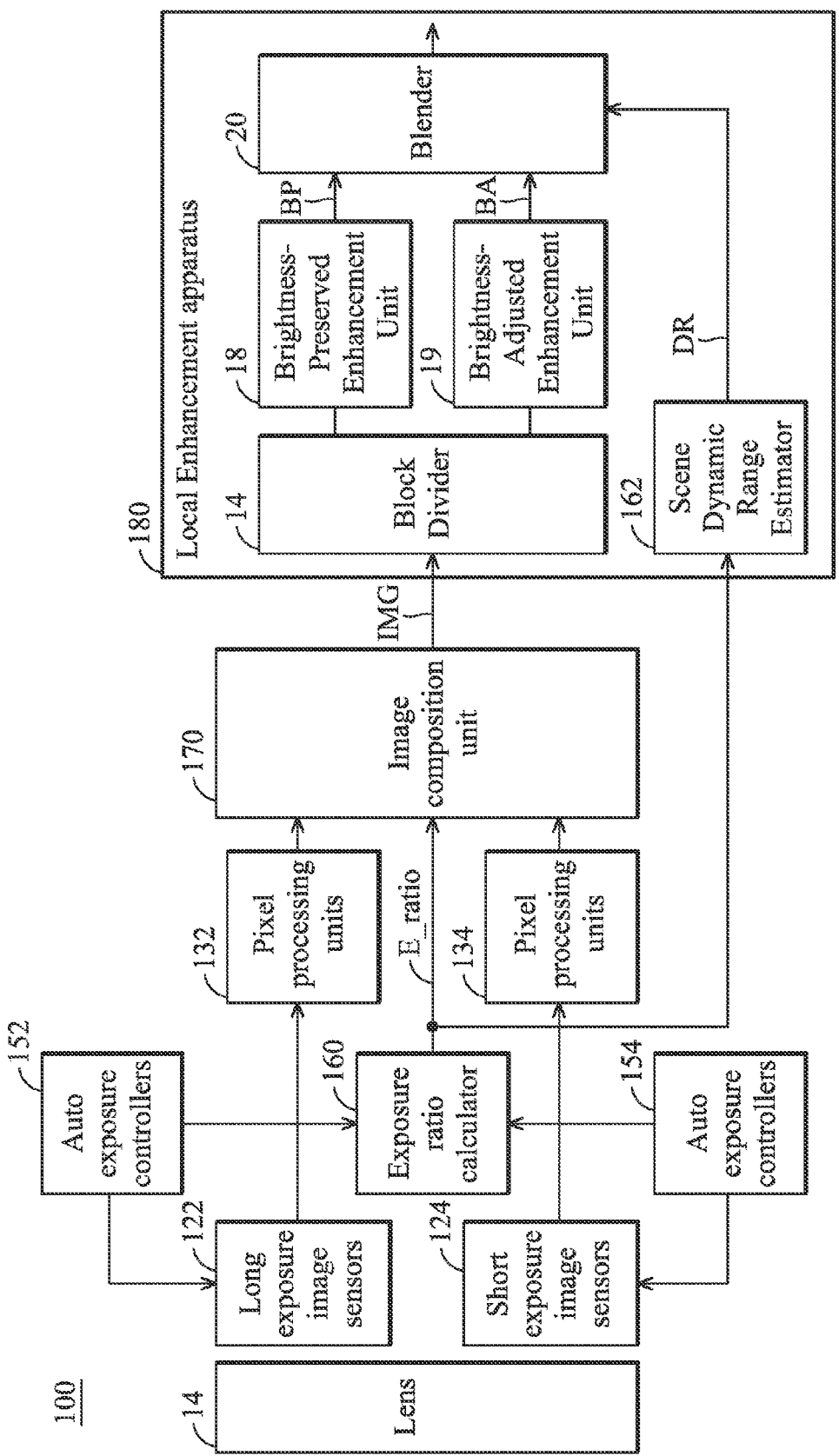
FIG. 2 shows a multiple exposure image system which uses a long exposure image sensor and a short exposure image sensor to capture a same scene.

FIG. 2 shows a block diagram of a multi-exposure imaging system 100 according to an embodiment of the invention. The multi-exposure imaging system 100 includes a long exposure image sensor 122 and a short exposure image sensor 124 to capture the same scene. As shown in FIG. 2, the image sensors 122 and 124 respectively capture images from the same scene via the same lens 110 (or different lens in another embodiment) with different exposure settings (including exposure time, gain of amplifier, etc.) to generate a long exposure image and a short exposure image. The long exposure image sensor 122 and the short exposure image sensor 124 may be independent pixel arrays or at different parts of one single pixel array. The pixel processing units 132 and 134 respectively perform preliminary image signal processing operation for the long exposure image and the short exposure image produced from the image sensors 122 and 124. The auto exposure controllers 152 and 154 respectively adjust the exposure setting of the long exposure image sensor 122 and the short exposure image sensor 124. The exposure ratio calculator 160 can calculate an exposure ratio E_ratio between the long and the short exposure of the image sensors 122 and 124 so that the image composition unit 170 can combine two images respectively captured by the long exposure image sensor 122 and the short exposure image sensor 124 into a composite image based on the exposure ratio E_ratio.

Then the local enhancement apparatus 180 receives the composite image IMG. The image IMG is divided into a plurality of blocks by block divider 14. Each block is processed by brightness-preserved enhancement unit 18 and brightness-adjusted enhancement unit 19. The brightness-preserved enhancement unit 18 performs histogram equalization and preserves the brightness of the block to output a brightness-preserved block BP; while the brightness-adjusted enhancement unit 19 performs histogram equalization, adjusts the brightness of the block to reveal more details, and outputs a brightness-adjusted block BA. The scene dynamic range estimator 162 generates the dynamic range DR of the image IMG based on the exposure ratio E_ratio. The blender 20 blends the brightness-adjusted block BA and the brightness-preserved block BP to generate an enhanced image based on the dynamic range DR. In a scene that its dynamic range is far below the maximum dynamic range (i.e., the dynamic range an image sensor can reproduce), a brightness-preserved contrast enhancement is preferred by the blender 20, while in another scene that its dynamic range is close to the dynamic range an image sensor can reproduce, the original contrast enhancement that adjusts brightness of each block is preferred by the blender 20. In one example, the blender 20 may use a weighting based on the dynamic range DR to blender the brightness-preserved block BP and brightness-adjusted block BA.

The exposure ratio E_ratio may be calculated according to the exposure time and the amplifier gain of the long exposure sensor and the exposure time and the amplifier gain of the short exposure sensor. The dynamic rang DR is substantially proportional to the exposure ratio E_ratio. That is, the higher the exposure ratio E_ratio is, the higher the dynamic range DR.

In another embodiment, the dynamic range DR is obtained by normalizing the exposure ratio E_ratio, such that the dynamic range DR is between 0 and 1. That is, $$DR = \min\left(\max\left(\frac{E\_ratio - E\_low}{E\_high - E\_low}, 0\right), 1\right)$$

Figure 3:
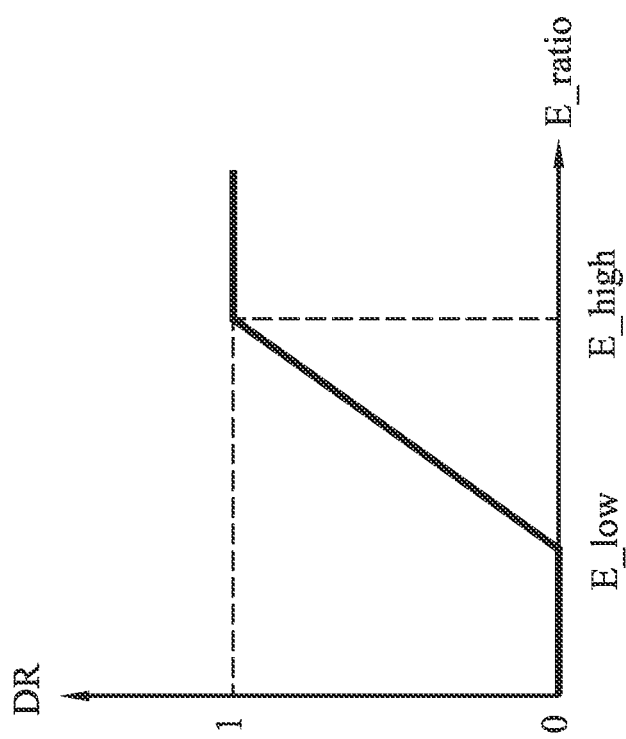
FIG. 3 illustrates a diagram of the dynamic range DR and the exposure ratio E_ratio.

E_low is a user-defined low threshold of the exposure ratio, and E_high is a user-defined high threshold of the exposure ratio, and are usually defined according to the limitation of the dynamic range of an image display or human eyes. FIG. 3 illustrates a diagram of the dynamic range DR and the exposure ratio E_ratio.

It can be easily found that the higher the dynamic range DR the wider the dynamic range of the image IMG. For processing a composite image IMG having a high dynamic range, there is a preference for enhancing its contrast and adjusting brightness of each block. Therefore, when the value of the dynamic range DR in an embodiment is as high as 1, the blender 20 only uses the brightness-adjusted enhancement unit 19 to generate the enhanced image. The brightness-adjusted enhancement unit 19 performs histogram equalization on the block to output a brightness-adjusted block BA, and the blender 20 uses all the blocks from the brightness-adjusted enhancement unit 19 to generate the enhanced image.

Figure 4:
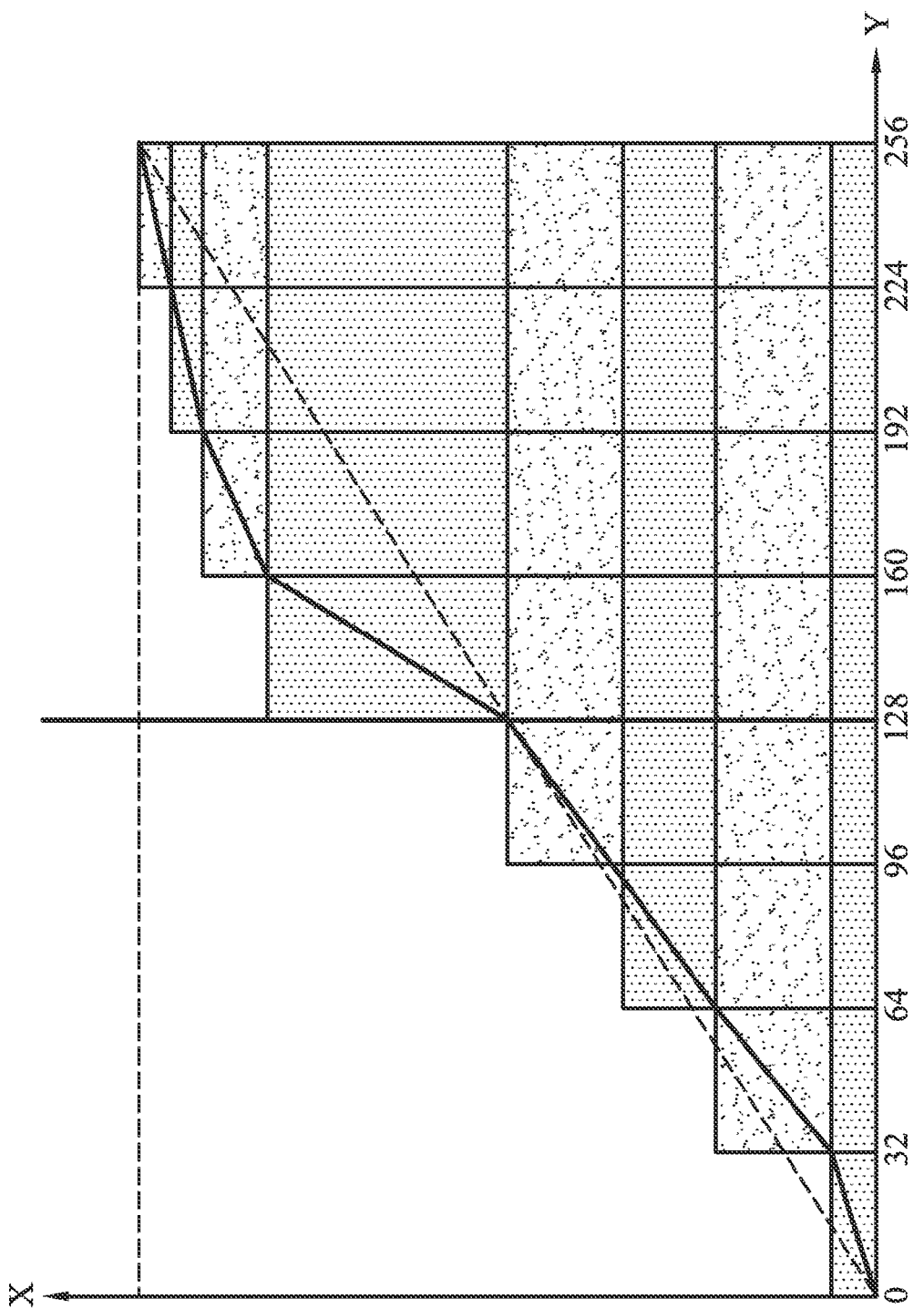
FIG. 4 is an illustrative diagram of the brightness-preserved contrast enhancement.

Oppositely, the lower the dynamic range DR the narrower the dynamic range of the image IMG. The images with narrower dynamic range can represent actual brightness of the scene, but may be sometimes too light and sometimes too dark. For the consistency between the actual scene and the human perception, the brightness of the narrower dynamic range image should be kept as same as possible. Thus, it is not appropriate to use the brightness-adjusted contrast enhancement to process the narrow dynamic range images. Therefore, when the value of the dynamic range DR in an embodiment is as low as 0, the blender 20 only uses the brightness-preserved enhancement unit 18 to enhance the contrast but substantially maintain the brightness of the composite image IMG. The brightness-preserved enhancement unit 18 performs histogram equalization and preserves the brightness of the block to output a brightness-preserved block BP, and the blender 20 uses all the blocks from the brightness-preserved enhancement unit 18 to generate the enhanced image. FIG. 4 is an illustrative diagram of the brightness-preserved contrast enhancement, which shows a curve of two segment histogram equalization on the image histogram. In the two segment histogram equalization, the image histogram is divided into any two number of segments: a bright (right) segment having brightness value greater than 128, and a dark (left) segment having brightness value smaller than 128. The histogram equalization is respectively performed on each of the two segments so that the contrast of the entire image is slightly improved without greatly changing its average brightness. The embodiment in FIG. 4 is merely for illustration, those skilled in the art can divide the image histogram into any number of segments.

While the dynamic range DR falls between 0 and 1, the blender 20 can blend the brightness-preserved block BP from the brightness-preserved enhancement unit 18 and the brightness-adjusted block BA from the brightness-adjusted enhancement unit 19 to obtain the enhanced image based on the dynamic range DR. Given that the brightness-preserved enhancement unit 18 performs the brightness-preserved contrast enhancement with a first contrast enhancement function CEF1 and the brightness-adjusted enhancement unit 19 performs the brightness-adjusted contrast enhancement with a second contrast enhancement function CEF2, the final contrast enhancement function CEFF by the blender 20 can be expressed as follows: $CEFF=DR \times CEF2 + (1-DR) \times CEF1$.

Figure 5:
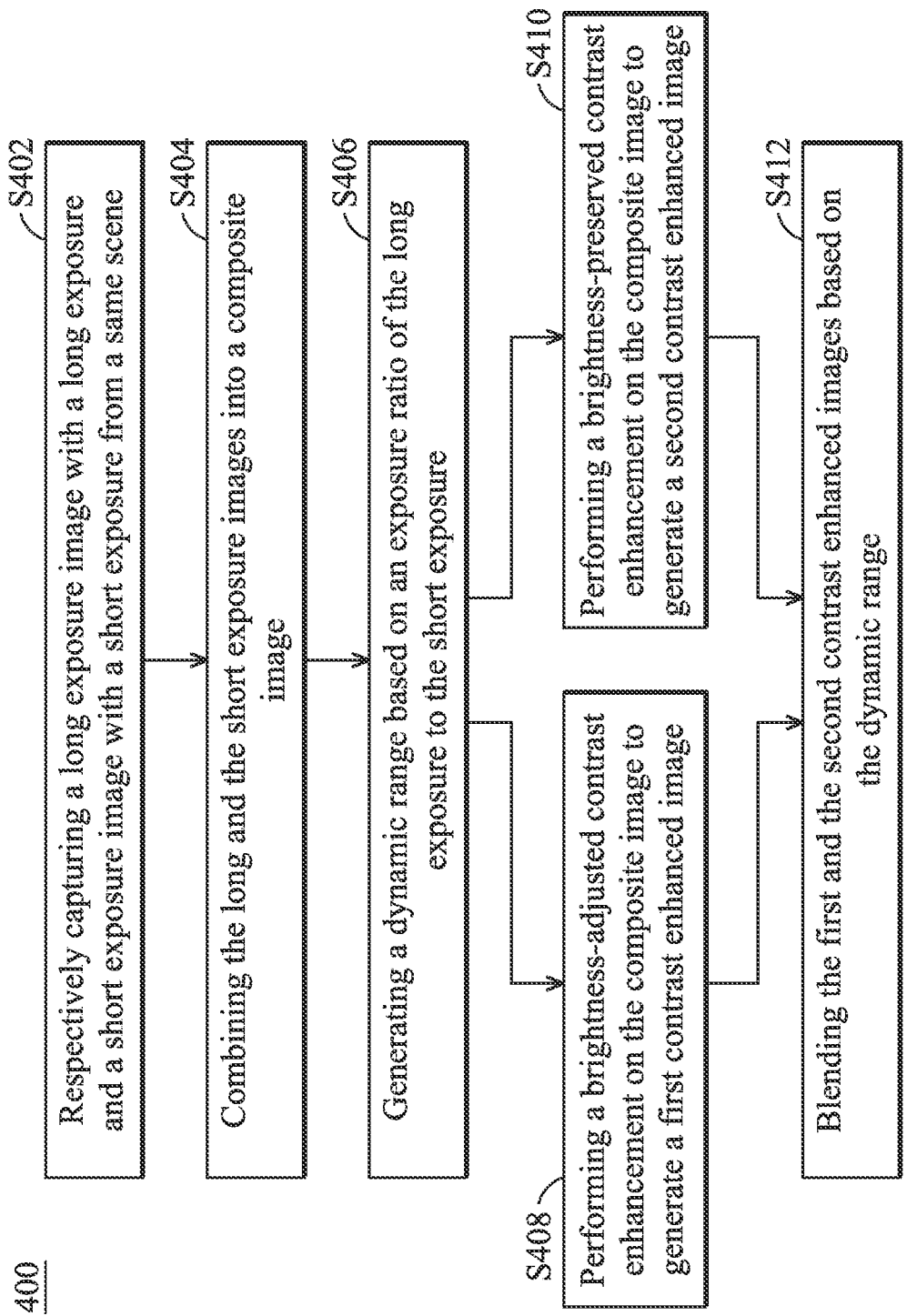
FIG. 5 is a flow chart of the contrast enhancement method according to an embodiment of the present invention.

FIG. 5 is a flow chart of the contrast enhancement method according to an embodiment of the present invention. The method 400 first, in step S402, a long exposure image with a long exposure and a short exposure image with a short exposure from a same scene are captured respectively. Next, in step S404, the long and the short exposure images are combined into a composite image. In step S406, a dynamic range based on an exposure ratio of the long exposure to the short exposure is generated. In step S408, a brightness-adjusted contrast enhancement on the composite image is performed to generate a first contrast enhanced image. In step S410, a brightness-preserved contrast enhancement is performed on the composite image to generate a second contrast enhanced image. Then, in step S412, the first and the second contrast enhanced images are blended based on the dynamic range.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A local enhancement apparatus, comprising:
    a block divider, for dividing an image into a plurality of blocks;
    a first enhancement unit, for performing a brightness-preserved enhancement on each of the plurality of blocks respectively to generate a plurality of brightness-preserved blocks;
    a second enhancement unit, for performing a brightness-adjusted enhancement on each of the plurality of blocks respectively to generate a plurality of brightness-adjusted blocks;
    a scene dynamic range estimator, for generating a dynamic range of the image according to characteristics of the image; and
    a blender, for blending the brightness-preserved blocks and the brightness-adjusted blocks to generate an enhanced image based on the dynamic range.

2. The local enhancement apparatus as claimed in claim 1, wherein the first enhancement unit performs histogram equalization on each of the plurality of blocks and preserves brightness of each of the plurality of blocks respectively to generate the brightness-preserved blocks and the second enhancement unit performs histogram equalization on each of the plurality of blocks and adjusts brightness of each of the plurality of blocks respectively to generate the brightness-adjusted blocks.

3. The local enhancement apparatus as claimed in claim 1, wherein the blender blends the brightness-preserved blocks and the brightness-adjusted blocks by a weighting based on the dynamic range.

4. The local enhancement apparatus as claimed in claim 1, wherein the brightness-preserved blocks are preferred by the blender when the dynamic range is far below a maximum dynamic range, and the brightness-adjusted blocks are preferred by the blender when the dynamic range is close to the maximum dynamic range.

5. A multi-exposure imaging system, comprising:
    a long exposure image sensor, for capturing a long exposure image based on a long exposure from a scene;
    a short exposure image sensor, for capturing a short exposure image based on a short exposure from the scene;
    an exposure ratio calculator, for obtaining an exposure ratio of the long exposure to the short exposure; and
    a local enhancement apparatus, for dividing a composite image into a plurality of blocks, performing a brightness-preserved enhancement and a brightness-adjusted enhancement on each of the plurality of blocks to generate a plurality of brightness-preserved blocks and a plurality of brightness-adjusted blocks respectively, and blending the brightness-preserved blocks and the brightness-adjusted blocks to generate an enhanced image based on the exposure ratio.

6. The multi-exposure imaging system as claimed in claim 5, further comprising:
    an image composition unit, for generating the composite image according to the short exposure image and the long exposure image.

7. The multi-exposure imaging system as claimed in claim 5, wherein the local enhancement apparatus comprises a scene dynamic range estimator for obtaining a dynamic range of the composite image according to the exposure ratio, and the local enhancement apparatus blends the brightness-preserved blocks and the brightness-adjusted blocks to generate the enhanced image by a weighting according to the dynamic range.

8. The multi-exposure imaging system as claimed in claim 7, wherein the brightness-preserved blocks are preferred by the local enhancement apparatus when the dynamic range is far below a maximum dynamic range, and the brightness-adjusted blocks are preferred by the local enhancement apparatus when the dynamic range is close to the maximum dynamic range.

9. The multi-exposure imaging system as claimed in claim 7, wherein the dynamic range is substantially proportional to the exposure ratio.

10. The multi-exposure imaging system as claimed in claim 7, wherein the scene dynamic range estimator obtains the dynamic range by normalizing the exposure ratio.

11. The multi-exposure imaging system as claimed in claim 7, wherein the scene dynamic range estimator normalizes the exposure ratio to obtain the dynamic range by an equation of $$DR = \min\left(\max\left(\frac{E\_ratio - E\_low}{E\_high - E\_low}, 0\right), 1\right),$$

wherein DR is the dynamic range, E_ratio is the exposure ratio, E_low is a user-defined low threshold of the exposure ratio, E_high is a user-defined high threshold of the exposure ratio, $$\max\left(\frac{E\_ratio - E\_low}{E\_high - E\_low}, 0\right)$$

obtains a larger one of $$\left(\frac{E\_ratio - E\_low}{E\_high - E\_low}\right)$$

and 0, and $$\min\left(\max\left(\frac{E\_ratio - E\_low}{E\_high - E\_low}, 0\right), 1\right)$$

obtains a smaller one of $$\max\left(\frac{E\_ratio - E\_low}{E\_high - E\_low}, 0\right)$$

and 1.

12. The multi-exposure imaging system as claimed in claim 11, wherein the local enhancement apparatus further comprises:
 a block divider for dividing the composite image into the plurality of blocks;
 a first enhancement unit, for performing the brightness-preserved enhancement on each of the plurality of blocks respectively to generate the brightness-preserved blocks;
 a second enhancement unit, for performing the brightness-adjusted enhancement on the each of the plurality of blocks respectively to generate the brightness-adjusted blocks; and
 a blender, for blending the brightness-preserved blocks and the brightness-adjusted blocks to generate the enhanced image based on the dynamic range.

13. The multi-exposure imaging system as claimed in claim 12, wherein, when the dynamic range falls between 0 and 1, the first enhancement unit performs a brightness-preserved contrast enhancement with a first contrast enhancement function and the second enhancement unit performs a brightness-adjusted contrast enhancement with a second contrast enhancement function, and a final contrast enhancement function of the blender is expressed as CEFF=DR×CEF2+(1−DR)×CEF1, wherein CEF1 is the first contrast enhancement function, CEF2 is the second contrast enhancement function, CEFF is the final contrast enhancement function and DR is the dynamic range.

14. The multi-exposure imaging system as claimed in claim 12, wherein the first enhancement unit performs histogram equalization on each of the plurality of blocks and preserves brightness of each of the plurality of blocks to generate the brightness-preserved blocks, and the second enhancement unit performs histogram equalization on each of the plurality of blocks and adjusts brightness of each of the plurality of blocks to generate the brightness-adjusted blocks.

15. A local enhancement method, comprising:
 capturing a long exposure image and a short exposure image based on a long exposure and a short exposure respectively from a same scene;
 combining the long exposure image and the short exposure image to obtain a composite image;
 generating a dynamic range based on an exposure ratio of the long exposure to the short exposure;
 performing a brightness-adjusted contrast enhancement on the composite image to generate a first contrast enhanced image;
 performing a brightness-preserved contrast enhancement on the composite image to generate a second contrast enhanced image; and
 blending the first contrast enhanced image and the second contrast enhanced image based on the dynamic range.

16. The local enhancement method as claimed in claim 15, wherein the dynamic range is substantially proportional to the exposure ratio.

17. The local enhancement method as claimed in claim 15, wherein the dynamic range is obtained by normalizing the exposure ratio.

18. The local enhancement method as claimed in claim 15, wherein the exposure ratio is normalized to obtain the dynamic range by an equation of $$DR = \min\left(\max\left(\frac{E\_ratio - E\_low}{E\_high - E\_low}, 0\right), 1\right),$$

wherein DR is the dynamic range, E_ratio is the exposure ratio, E_low is a user-defined low threshold of the exposure ratio, E_high is a user-defined high threshold of the exposure ratio, $$\max\left(\frac{E\_ratio - E\_low}{E\_high - E\_low}, 0\right)$$

obtains a larger one of $$\left(\frac{E\_ratio - E\_low}{E\_high - E\_low}\right)$$

and 0, and $$\min\left(\max\left(\frac{E\_ratio - E\_low}{E\_high - E\_low}, 0\right), 1\right)$$

obtains a smaller one of $$\max\left(\frac{E\_ratio - E\_low}{E\_high - E\_low}, 0\right)$$

and 1.

19. The multi-exposure imaging system as claimed in claim 5, wherein only brightness-adjusted blocks are used to generate the enhanced image when the dynamic range is 1, and only the brightness-preserved blocks are used to generate the enhanced image when the dynamic range is 0.

* * * * *